June 11, 1957 W. MEYER 2,795,694

CASCODE AMPLIFIER WITH SIGNAL AND A. G. C. VOLTAGES APPLIED TO DIFFERENT STAGES

Filed Sept. 27, 1954 2 Sheets-Sheet 1

| CHANNEL | TOTAL TILT 0-6 VOLT AGC | PEAK TO VALLEY, MAX. | NOISE AT 0 BIAS, db | X-GAIN AT 0 BIAS 300-Ω OPEN CKT |
|---|---|---|---|---|
| 2 | 1-1/2 db | 1-1/2 db | 5.5 db | 91 |
| 3 | 1 db | 1-1/2 db | 6.5 db | 87 |
| 4 | 1-1/2 db | 1-1/2 db | 6.0 db | 83 |
| 5 | 1 db | 1-1/2 db | 6.0 db | 74 |
| 6 | 1.0 db | 1-1/2 db | 6.5 db | 68 |
| 7 | 1 db | 1.0 db | 8.0 db | 51 |
| 8 | 1 db | 1.0 db | 8.0 db | 48 |
| 9 | 1/2 db | 1.0 db | 8.0 db | 49 |
| 10 | 1.0 db | 1.0 db | 8.0 db | 49 |
| 11 | 1.0 db | 1.0 db | 8.5 db | 49 |
| 12 | 1-1/2 db | 1.0 db | 8.0 db | 49 |
| 13 | 1-1/2 db | 1.0 db | 8.0 db | 53 |

INVENTOR.
WALTER MEYER

BY

Ostrolenk & Faber

ATTORNEYS

INVENTOR.
WALTER MEYER
BY
Ostrolenk & Faber
ATTORNEYS 2,795,694

CASCODE AMPLIFIER WITH SIGNAL AND A. G. C. VOLTAGES APPLIED TO DIFFERENT STAGES

Walter Meyer, Rivera, Calif., assignor to Standard Coil Products Co., Inc., Los Angeles, Calif., a corporation of Illinois Application September 27, 1954, Serial No. 458,489

6 Claims. (Cl. 250—20)

The present invention relates to television frequency selectors and more particularly it relates to improvements in the radio frequency amplifier section of a television frequency selector.

Present day tuners or frequency selectors used in television receivers are generally provided with a radio frequency amplifier section which may consist of a pentode amplifier, a simple triode amplifier, or what is known in the art as a cascode amplifier. The best performance, however, has been obtained with the last mentioned amplifiers, namely, the cascode amplifiers, using circuits such as disclosed in application Serial No. 211,959, filed February 20, 1951, assigned to the assignee of the present invention. Cascode amplifiers use two triode sections, one of which operates as a grounded cathode amplifier and the second section operates as a grounded grid amplifier.

It was found that when the circuit is appropriately designed, it will provide high gain at least comparable to that of the pentode and a very low noise figure. It was also found, however, that cascode amplifiers prior to the present time exhibited tilt with bias which is due primarily to changes in input tuning and band width of the cascode amplifier. It was found, for example, that on the lower V. H. F. channels, a maximum tilt of 9 db occurred at channel 6 for a bias change of zero to −4 volts representing a gain change of approximately 12 db. On the upper channels, the tilt was found to be a maximum in some cases on channel 13 with a total of 5 db for the same change in bias, that is, from zero to −4 volts. It was found also that the plate circuit impedance of the cascode amplifier varies with tuning and loading, thus further complicating the problem of tilt with bias.

Attempts have been made to reduce tilt with bias which, however, proved fruitless. For example, when neutralization of the cascode stage was attempted, it was found that the degree of neutralization for minimum tilt does not coincide with the best noise figure. Also, the reduction of tilt usually resulted in over neutralization and resulting instability. Because of the cathode lead inductance, complete neutralization is difficult. Furthermore, neutralization is frequency sensitive so that it becomes difficult to obtain a compromise design capable of providing good operation that is in this case, minimum tilt with bias at all the desired television frequencies.

Unbypassed cathode resistors have also been used in the attempt of reducing tilt with bias. They, however, caused loss of performance due to degeneration and required different resistor values for low and high frequencies if effective results were desired.

Still other attempts were made by resistively or capacitively loading the input circuit of a cascode amplifier. It was found, however, that capacitive loading is not usable because of the minimum inductance requirements on the high channels and minimum band width requirements on lower channels. As for resistive loading, it resulted in severe loss of gain and noise figure when resistances were used to suitably compensate a cascode circuit.

The radio frequency amplifier of the tuner of the present invention is provided with novel means and circuitry for reducing tilt with bias which means and circuitry do not cause the difficulties mentioned above.

One object of the present invention is, therefore, a television frequency selector having a minimum of tilt with bias.

Still another object of the present invention is a radio frequency amplifier of the cascode type having minimum tilt with bias.

Still another object of the present invention is a cascode amplifier having novel D.-C. connections so that when incorporated in a television tuner, a low noise high gain tuner with stabilized input impedance is obtained.

The tuner of the present invention consists essentially of radio frequency amplifier stage, a local oscillator stage and a mixer stage each provided with tuning means for tuning the frequency selector or tuner to the desired television channel in either the V. H. F. or U. H. F. range. The radio frequency amplifier consists of a cascode amplifier in which, at radio frequencies, the cathode of the first triode is connected to ground and the grid of the second riode is connected to ground.

A.-C. coupling between the plate of the first section and the cathode of the second section is obtained by means of an inductance and capacitance in series in a manner well known in the art, for example, as described in the above mentioned application. D.-C. connections are obtained, however, in a novel way. The B+ supply is applied to the plate of the first triode through a choke, that is, through an impedance having a small magnitude at D.-C. and having a very large magnitude at radio frequencies.

When the first triode is conducting, since the cathode of the first section is D.-C. connected to the plate of the second section, a D.-C. voltage will appear at the plate of the second section. The cathode of the second section is connected to ground through a second choke having high impedance at radio frequency and low impedance at D.-C. This provides the path to ground for the D.-C. currents.

To summarize the above, in this novel cascode amplifier, the two triode sections are connected in series as far as D.-C. is concerned, the D.-C. path being as follows: B+ supply, R. F. choke, plate of first section, cathode of first section, plate of second section, cathode of second section, second R. F. choke and ground. Using this circuit, it is found that when control bias is applied to the grid of the second stage, its gain is reduced, its D.-C. plate resistance rises thus reducing the effective plate voltage on the first stage. The gain of the first stage is thus reduced because of the reduced plate current and the resulting drop in tube transconductance or gm.

To reduce the tilt due to changes in plate circuit tuning of the cascode amplifier, second stage neutralization was removed resulting in the reduction of plate shift to a negligible value.

The final circuit incorporating the above novel features of the present invention was found to have only a very slight change in peak to valley of the double tuned interstage due to changes in plate resistance of the second stage. It was, however, found that by the use of unbypassed cathode resistors, the remaining change in input impedance could be very effectively reduced.

Accordingly, another object of the present invention is the provision of means for effectively reducing changes in the input impedance of the cascode R. F. amplifier.

These and other objects of the present invention will be apparent from the following description when taken in connection with the drawings in which.

Figures 2, 4, 5, 6:
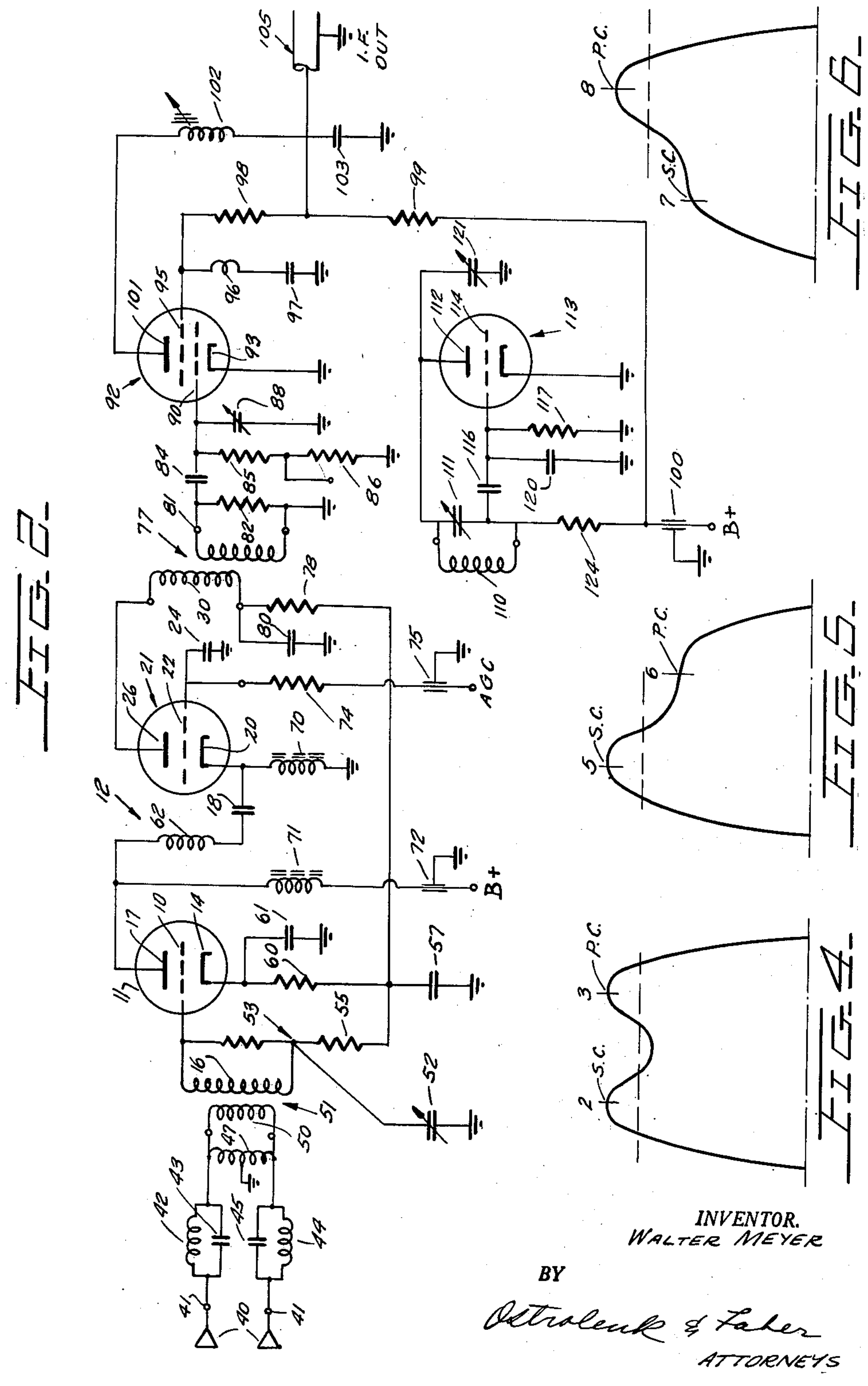
Figure 2 is a complete schematic circuit diagram of the television frequency selector incorporating the radio frequency cascode amplifier of the present invention.

Figures 4, 5, and 6 are curves showing varying effects produced on sound and picture carriers of the television system.

Figures 1, 3:
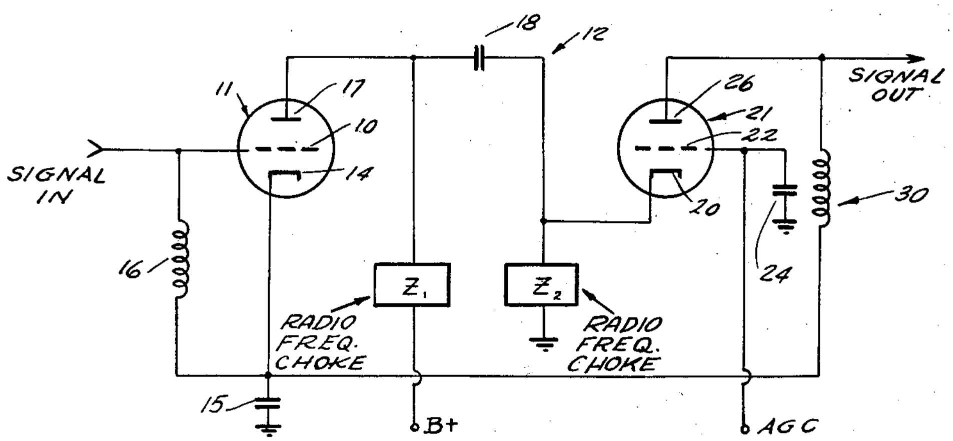
Figure 1 is a schematic circuit diagram of the novel cascode amplifier of the present invention.
Figure 3 is a chart showing the tilt with bias measured in the novel television frequency selector of the present invention.

Referring first to Figure 1 showing the basic concept of the present invention, the R. F. signal having a frequency in the television frequency range is applied through well known means, not shown in Figure 1, from the television antenna to the grid 10 of the first triode section 11 of cascode amplifier 12.

Triode section 11 has its cathode 14 connected to ground through a capacitor 15. Coil 16 is connected between the grid 10 and cathode 14 of first triode section 11. Plate 17 of triode section 11 is connected to a coupling capacitor 18 in turn connected to the cathode 20 of second triode section 21 of the cascode amplifier 12. The grid 22 of second triode section 21 is connected to ground through a capacitor 24.

Plate 26 of second triode section 21 is connected to any appropriate output circuit such as the one described here in connection with Figure 2 of which only one part, namely the primary winding 30, is shown in Figure 1. More specifically, winding 30 is connected between the plate 26 of triode section 21 and the cathode 14 of triode section 11. As far as radio frequencies are concerned, in other words, considering the R. F. equivalent circuit, it will be seen from Figure 1 that the R. F. signal is first amplified by triode section 11 having its cathode effectively grounded at radio frequencies so that the amplified R. F. is then applied through coupling capacitor 18 to the cathode 20 of the second triode section 21.

The second triode section 21 operates as a grounded grid amplifier since the grid 22 is effectively connected to ground at radio frequencies through capacitor 24. The final amplified R. F. signal appears across inductor 30.

The D. C. supply voltage is connected instead to plate 17 of the first triode section 11 through an impeder $Z_1$ exhibiting high impedance to radio frequency signals and low D. C. resistance. Cathode 14 of first triode section 11 is connected to coil 30 which in turn is connected to the plate 26 of the second triode section 21. Cathode 20 of the second triode section 21 is connected to ground through impeder $Z_2$ also exhibiting high impedance to radio frequency signals and low D. C. resistance. Because of the low resistance of impeder $Z_2$, the D. C. plate voltage of the second triode section 21 is essentially the voltage appearing between cathode 14 of the first triode section 11 and ground.

The effective D. C. plate voltage of tube 11, on the other hand, because of the low resistance of impeder $Z_1$, is effectively the D. C. supply voltage minus the voltage of cathode 14 of triode section 11. Grid 22 of the second triode section 21 is also provided with a terminal which, in Figure 1, is denoted as AGC. To this terminal are applied automatic gain control voltages, that is, D. C. biases responsive to the amplitude of the received signals obtained in a manner well known in the art.

By the proper choice of minimum bias values for each stage 11 and 21, the total B+ supply voltage can be made to divide in proper proportions for maximum resultant gain and noise performance consistent with tube dissipation values.

As the AGC bias is applied to the grid 22 of the second triode section 21, and in particular as this control bias is increased in the negative direction, the gain of amplifying tube 21 is reduced and its D. C. plate resistance rises thus also reducing the effective plate to cathode voltage of the first triode section 11. The plate current through first triode section 11 and its gm is, therefore, reduced causing a similar reduction in the gain of the first triode section 11. By such D. C. connection, it was found that tilt with bias could be reduced considerably. For example, the 9 db tilt in prior cascode amplifiers was reduced to only 3 db by the novel circuitry of the present invention.

Other novel features of the present invention are shown in Figure 2 which also has the novel D. C. connections described above in connection with Figure 1. The same numerals as noted above in connection with Figure 1 are used in this Figure 2 to denote the same elements. The television antenna is denoted by numeral 40 and is shown as a balanced aerial.

The balanced transmission line 41 connects antenna 40 to two parallel circuits, one connected to each conductor of transmission line 41. More specifically, inductance 42 in parallel with capacitance 43 is connected in series to the upper conductor of transmission line 41 while inductance 44 in parallel with capacitor 45 is connected in series with a lower conductor of transmission line 41. The two parallel circuits 42—43 and 44—45 are connected to each other through the coil 47 having its center tap grounded.

Across coil 47 is also connected the primary 50 of radio frequency transformer 51. The secondary 16 of R. F. transformer 51 is connected on one side to the grid 10 of the first triode section 11 and on the other side to ground through a variable or trimming capacitor 52. Connected across coil 16 is a resistor 53 which produces the desired band width. A resistor 55 is connected between the junction point 56 of capacitor 52 and resistor 53 on one side and on the other to another capacitor 57 connected to ground.

The cathode 14 of triode section 11 is connected to the high side of capacitor 57 through a cathode resistor 60 bypassed by a capacitor 61. Plate 17 of triode section 11 is connected to a coil 62 in series with a coupling capacitor 18 in turn connected to the cathode 20 of the second triode section 21. Cathode 20 of the second triode section 21 is connected to ground through a radio frequency choke 70.

Plate 17 of the first triode section 11 is connected to the B+ supply also through another radio frequency choke 71 and appropriate feed through capacitor 72 in series with choke 71. It will be noted that choke 71 corresponds to impeder $Z_1$ and choke 70 to impeder $Z_2$.

Grid 22 of triode section 21 is connected to capacitor 24, the other terminal of which is grounded. Grid 22 is also connected to the AGC terminal through a resistor 74 in series with a feed through capacitor 75. Plate 26 of the second triode section 21 is connected to coil 30 which is also the primary winding of a second R. F. transformer 77 in turn connected to a resistor 78 and bypassed to ground by a capacitor 80. Resistor 78 is connected on the other side to the high side of capacitor 57.

Secondary 81 of R. F. transformer 77 is connected across a broad banding resistor 82 with its low side connected to ground and its high side connected to a coupling capacitor 84 which in turn is connected to equal resistors 85 and 86 connected in series between capacitor 84 and ground. Shunting resistor 85—86 is a trimming capacitor 88. Coupling capacitor 84, which is connected on one side to winding 81, is connected on the other side to the grid 90 of mixer tube 92.

Cathode 93 of mixer tube 92 is grounded. Screen grid 95 of mixer tube 92 is connected to ground through the coil 96 in series with capacitor 97. Screen grid 95 is also connected to the B+ supply through dropping resistor 98—99 in series and a feed through capacitor 100. Plate 101 of tube 92 is connected to a coil 102 which is tuned to the intermediate frequency, for example, 41 megacycles.

A capacitor 103 is connected both to the junction point between resistors 98 and 99 and the low side of coil 102. To the high side of capacitor 103 is connected the I. F. terminal or output terminal shown schematically at 105. Also mutually coupled with winding 81 on the input side of mixer tube 92 is a coil 110 tuned by means of a capacitor 111. The parallel circuit 110—111 is connected on one side to the plate 112 of the oscillator tube 113 and on the other side to the grid 114 of oscillator tube 113 through a coupling capacitor 116.

Connecting grid 114 and ground is a parallel network consisting of resistor 117 and capacitor 120. Plate 112 is connected to ground through a fine series capacitor 121. Plate 112 is further connected to the B+ supply through a series circuit consisting of the previously mentioned tuning coil 110 and the dropping resistor 124 in series with previously mentioned feed through capacitor 100.

It is now possible to describe the operation of the television tuner shown in Figure 2. The television signal is picked up by antenna 40 and transformed at transformer 51 from balanced to unbalanced and then applied to the grid of the first triode section 11 of cascode amplifier 12. The output from cascode amplifier 12 is coupled into the input of mixer tube 92 while at the same time the local oscillator signal of the correct frequency is also injected in the input of mixer tube 92 so that at the I. F. output terminal 105, the desired I. F. signal is obtained.

It is, of course, well known in the art that for each television tuner, it will be necessary to use different tuning elements for each television channel, the tuning elements in this case being windings 50, 16—30, 81 and 110. It will be noted that the cascode amplifier 12 of Figure 2 is somewhat different from the one shown in Figure 1. In fact, the cascode amplifier 12 of Figure 2 not only incorporates the basic novel feature of the present invention but is further improved since the remaining change in input impedance is effectively reduced in this circuit by the proper choice of the cathode bias resistor 60 in the first section 11 thereof.

While cathode resistor 60 is shown by-passed to ground by capacitor 61, it can actually be by-passed or not, the unbypassed condition giving slightly better compensation. It is important, however, to note that adequate compensation can be realized by a by-passed cathode resistor such as the one shown by 60 in Figure 2 so that electrical performance need not suffer from degenerative effects. The use of a cathode resistor does make the cut off characteristics of the stage more remote.

By this additional improvement, the tilt with AGC variations of 6 volts from zero to −6 volts never exceeded 1 and ½ db as shown in the chart of Figure 3 in which are listed the experimental result on a V. H. F. tuner incorporating the basic features of the present invention and essentially of the type shown in Figure 2.

In an actual physical embodiment of the television tuner of Fig. 2, the following component and component values were used:

| | | |
|---|---|---|
| Tube **11—21** | | 6BZ7 |
| Resistor **53** | | 22K |
| Resistor **55** | | 47K |
| Resistor **60** | ohms | 100 |
| Capacitor **52** | mmf | 1–3 |
| Capacitor **57** | mmf | 1000 |
| Capacitor **61** | mmf | 1000 |
| Capacitor **18** | mmf | 1000 |
| Capacitor **72** | mmf | 1000 |
| Resistor **74** | | 47K |
| Capacitor **75** | mmf | 1000 |
| Capacitor **80** | mmf | 47 |
| Resistor **78** | ohms | 680 |
| Resistor **82** | do | 5600 |
| Capacitor **84** | mmf | 47 |
| Resistor **85** | | 100K |
| Resistor **86** | | 100K |
| Capacitor **88** | mmf | 1–3 |
| Tube **92—113** | | 6U8 |
| Capacitor **97** | mmf | 220 |
| Resistor **98** | ohms | 15,000 |
| Resistor **99** | do | 1500 |
| Capacitor **103** | mmf | 75 |
| Capacitor **116** | mmf | 10 |
| Capacitor **120** | mmf | 5 |
| Resistor **117** | ohms | 10,000 |
| Capacitor **121** | mmf | 1–3 |
| Resistor **124** | ohms | 3300 |
| Capacitor **111** | | Fine tuner |

Referring to Figures 4, 5 and 6, in Figure 4 two pictures are shown, one the sound carrier marked S. C. and the other the picture carrier marked P. C. Here the sound carrier and picture carrier peaks are of substantially the same magnitude and represent the ideal condition.

In Figure 5 the sound carrier S. C. is at a much higher amplitude than the picture carrier at P. C. This is known as "tilt" and is a highly undesirable condition brought about through improper AGC.

The same undesirable condition is shown in Figure 6 where the sound carrier is shown having a lower peak than the picture carrier. In the latter two cases, Figures 5 and 6, reception is relatively poor and the present invention is directed toward the correction of this tilt.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a television frequency selector, a radio frequency amplifier section comprising a pair of triode tubes, the cathode of one of said tubes being effectively connected to ground at the radio frequencies, the grid of the second of said tubes being effectively connected to ground at radio frequencies, A. C. coupling means between the plate of the first triode and the cathode of the second triode, a source of D. C. power having one terminal grounded, a first impedor having low D. C. resistance and high reactance to television frequencies, one terminal of said impedor being connected to the other terminal of said source of D. C. power, the other terminal of said impedor being connected to the plate of the said first triode, the cathode of the said first triode being D. C. connected to the plate of said second triode, and a second impedor having a low D. C. resistance and high reactance to television frequencies, the cathode of the second triode providing the return to ground through said second impedor and automatic gain control means connected to the grid of said second triode for controlling the gain of said radio frequency amplifier.

2. A television frequency selector comprising a radio frequency amplifier stage, an oscillator stage and a converter stage, tuning means at the input and output of said radio frequency amplifier stage, tuning means at the input of said converter stage, and frequency determining means connected in said oscillator stage, said R. F. amplifier output tuning means, said frequency determining means, and said converter input tuning means being mutually coupled, a fixed tuning means at the output of said converter stage for deriving the intermediate frequency signals, said radio frequency amplifier stage comprising a pair of triodes, the cathode of the first of said triodes being effectively connected to ground at radio frequencies, the grid of the second of said triodes being also effectively connected to ground at radio frequencies, an inductor in series with a capacitor for A. C. coupling the plate of the said first triode to the cathode of the second triode, said two triodes being connected in a series D. C. path comprising, in order, a source of D. C. power, a low D. C. resistance impedor, the plate of said first triode, the cathode of said first triode, a bypassed resistor for the cathode of said first triode, a dropping resistor for the plate of said second triode, a low D. C. resistance inductor, the plate of said second triode, the cathode of said second triode, and a low D. C. resistance inductor and ground; automatic gain control means connected to the grid of said second triode for varying the D. C. potential distribution in said D. C. path.

3. A television frequency selector comprising a radio frequency amplifier stage, an oscillator stage and a converter stage, tuning means at the input and output of said radio frequency amplifier stage, tuning means at the input of said converter stage, and frequency determining means connected in said oscillator stage, said R. F. amplifier output tuning means, said frequency determining means, and said converter input tuning means being mutually coupled, a fixed tuning means at the output of said converter stage for deriving the intermediate frequency signals, said radio frequency amplifier stage comprising a pair of triodes, the cathode of the first of said triodes being effectively connected to ground at radio frequencies, the grid of the second of said triodes being also effectively connected to ground at radio frequencies, an inductor in series with a capacitor for A. C. coupling the plate of the said first triode to the cathode of the second triode, said two triodes being connected in a series D. C. path comprising, in order, a source of D. C. power, a low D. C. resistance impedor, the plate of said first triode, the cathode of said first triode, a by-passed resistor for the cathode of said first triode for effectively reducing changes in input impedance of said radio frequency amplifier stage, a dropping resistor for the plate of said second triode, a low D. C. resistance inductor, the plate of said second triode, the cathode of said second triode, and a low D. C. resistance inductor and ground; automatic gain control means connected to the grid of said second triode for varying the D. C. potential distribution in said D. C. path.

4. In a high frequency amplifier comprising a pair of triodes, the cathode of one of said triodes being effectively connected to ground at radio frequencies, the grid of the second of said triodes being effectively connected to ground at radio frequencies, A. C. coupling means between the plate of the first triode and the cathode of the second triode, a source of D. C. power having one terminal grounded, an impedor having low D. C. resistance and high reactance to television frequencies, one terminal of said impedor being connected to the other terminal of said source of D. C. power, the other terminal of said impedor being connected to the plate of the said first triode, the cathode of the said first triode being D. C. connected to the plate of said second triode, a second impedor having low D. C. resistance and high reactance to television frequencies, said impedor being connected to the cathode of the second triode providing the return to ground, and automatic gain control means connected to the grid of said second triode controlling the gain of said high frequency amplifier.

5. A high frequency amplifier having tuning means at its input and output, a pair of triodes, the cathode of the first of said triodes being effectively connected to ground at radio frequencies, the grid of the second of said triodes being also effectively connected to ground at radio frequencies, an inductor in series with a capacitor connected between the plate of the said first triode and the cathode of said second triode providing the necessary A. C. coupling, said two triodes being connected in a series D. C. path comprising in order a source of D. C. power, a low D. C. resistance impedor, the plate of said first triode, the cathode of said first triode, a by-passed resistor for the cathode of said first triode, a dropping resistor for the plate of said second triode, a low D. C. resistance inductor, the plate of said second triode, the cathode of said second triode and a low D. C. resistance inductor to ground, automatic gain control means connected to the grid of said second triode for varying the D. C. potential distribution in said D. C. path, thereby varying the gain of said first triode.

6. A radio frequency amplifier comprising a pair of electron tubes, the cathode of the first of said tubes being effectively connected to ground at radio frequencies, the grid of the second of said tubes being also effectively connected to ground at radio frequencies, an inductor in series with a capacitor for A. C. coupling the plate of the said first tube to the cathode of the second tube, said two tubes being connected in a series D. C. path comprising, in order, a source of D. C. power, a low D. C. resistance impedor, the plate of said first tube, the cathode of said first tube, a by-passed resistor for the cathode of said first tube for effectively reducing changes in input impedance of said radio frequency amplifier stage, a dropping resistor for the plate of said second tube, a low D. C. resistance inductor, the plate of said second tube, the cathode of said second tube, and a low D. C. resistance inductor and ground; automatic gain control means connected to the grid of said second tube for varying the D. C. potential distribution in said D. C. path.

References Cited in the file of this patent

UNITED STATES PATENTS

| | | |
|---|---|---|
| 2,069,809 | Armstrong | Feb. 9, 1937 |
| 2,241,892 | Strong | May 13, 1941 |
| 2,428,295 | Scantlebury | Sept. 30, 1947 |
| 2,629,817 | Cotsworth | Feb. 24, 1953 |
| 2,673,254 | Eland | Mar. 23, 1954 |
| 2,692,919 | Cohen | Oct. 26, 1954 |
| 2,750,450 | Achenbach et al. | June 12, 1956 |

FOREIGN PATENTS

| | | |
|---|---|---|
| 559,078 | Great Britain | Feb. 3, 1941 |
| 702,310 | Great Britain | Jan. 13, 1954 |

OTHER REFERENCES

Valley et al.: Text "Vacuum Tube Amplifiers," p. 402, pub. 1948 by McGraw-Hill Book Co., New York, N. Y. (Copy in Class II.)